United States Patent [19]

Gosser et al.

[11] Patent Number: 5,135,731

[45] Date of Patent: Aug. 4, 1992

[54] METHOD FOR CATALYTIC PRODUCTION OF HYDROGEN PEROXIDE

[75] Inventors: Lawrence W. Gosser, Wilmington, Del.; Michael A. Paoli, Memphis, Tenn.

[73] Assignee: E. I. Du Pont de Nemours and Company, Wilmington, Del.

[21] Appl. No.: 700,684

[22] Filed: May 15, 1991

[51] Int. Cl.$^5$ ............................................. C01B 15/01
[52] U.S. Cl. .................................................. 423/584
[58] Field of Search ........................................ 423/584

[56] References Cited

U.S. PATENT DOCUMENTS 3,122,417  2/1964  Blaser et al. ...................... 423/584
3,336,112  8/1967  Hooper ............................... 423/584
3,383,174  5/1968  Carnine et al. ..................... 23/207.5
3,470,243  9/1969  Crutchfield et al. .............. 260/502.5
4,009,252  2/1977  Izumi et al. ........................ 423/584
4,070,442  1/1978  Watts ................................... 423/584
4,889,705  12/1989  Gosser ................................ 423/584

Primary Examiner—Wayne Langel

[57] ABSTRACT

An improved process for directly producing hydrogen peroxide from oxygen and hydrogen is disclosed. Hydrogen and oxygen are contacted in the presence of a catalyst, acid, halide ions and a multifunctional phosphonate or phosphate preparation so as to increase hydrogen peroxide yield and decrease catalyst deactivation.

17 Claims, 3 Drawing Sheets

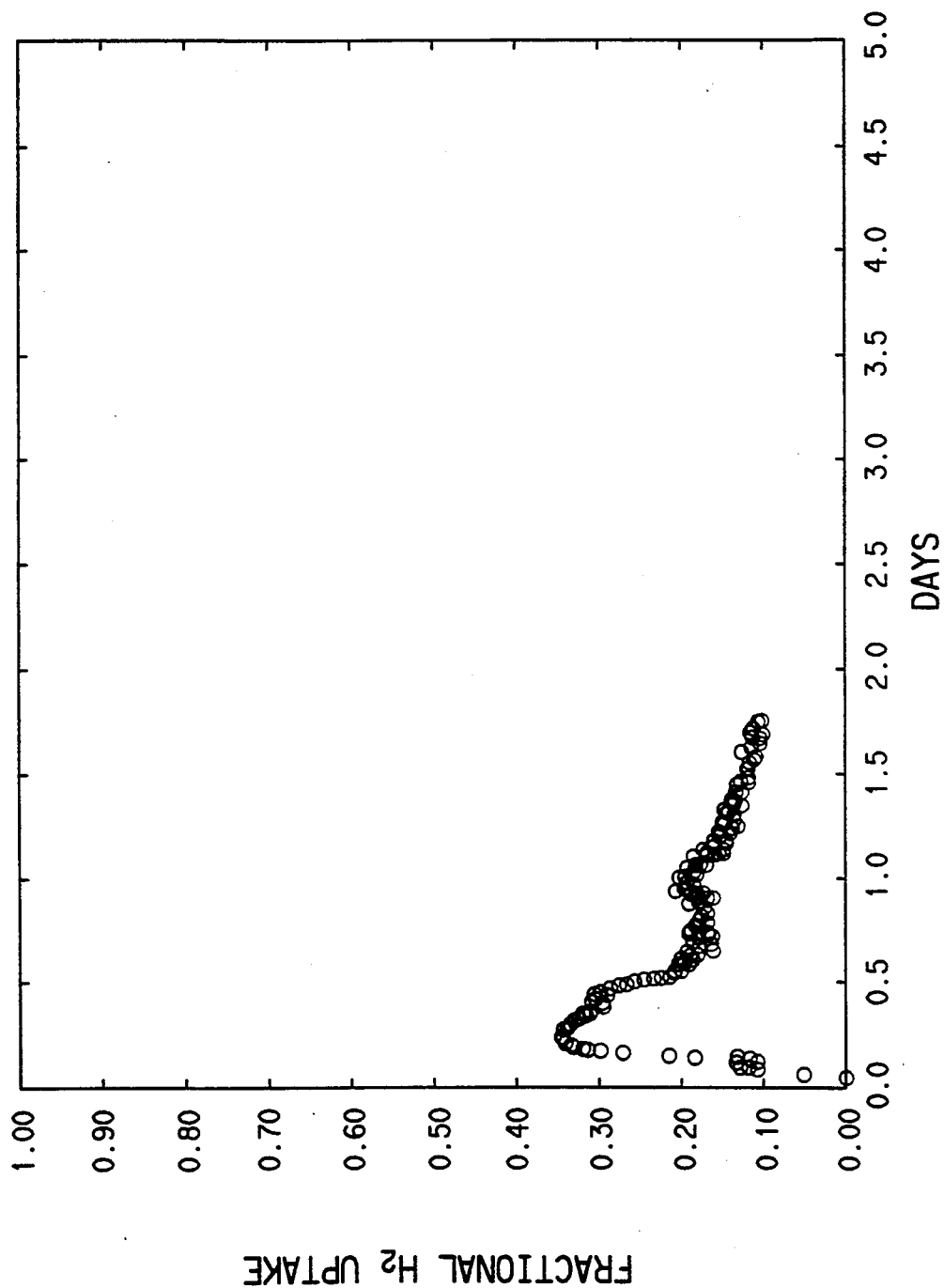

METHOD FOR CATALYTIC PRODUCTION OF HYDROGEN PEROXIDE

BACKGROUND OF THE INVENTION

1. Field of the Invention

This invention relates to an improved process for producing hydrogen peroxide by directly contacting hydrogen and oxygen in the presence of a metal catalyst and in the optional presence of a stabilizer. According to the process herein, hydrogen and oxygen are contacted in the presence of a catalyst and a multifunctional phosphonate or phosphate preparation, in the presence of halide ions and acid, to make hydrogen peroxide. The use of such preparations in the process results in a decrease in catalyst deactivation.

2. Technical Background

Various processes for making hydrogen peroxide by means of the direct combination of oxygen and hydrogen, in the presence of a catalyst, are known. U.S. Pat. No. 3,336,112, for example, discloses a process for the direct production of hydrogen peroxide comprising contacting a mixture of gases containing oxygen and hydrogen with a solid catalyst having a metallic component selected from the group consisting of metals in Group VIII of the Periodic Table, in the presence of a liquid containing water and a stabilizer. "Sequestrative" hydrogen peroxide stabilizers, including phosphoric acids, are used. For this purpose, phosphonate polymers containing two or more acid phosphonate groups are preferably used.

U.S. Pat. No. 4,009,252 discloses a process for preparing hydrogen peroxide by reacting hydrogen and oxygen in an aqueous medium containing a platinum group catalyst characterized in that the partial pressure of hydrogen and the partial pressure of oxygen are maintained at at least 0.5 atmosphere and at least 1.0 atmosphere respectively, and the platinum group catalyst is caused to be present in an amount, calculated as a metal, of at least a minimum effective catalyst amount up to 30 mg per 100 ml. of said aqueous medium.

U.S. Pat. No. 3,470,243 claims tetrakis (dihydrogen phosphono methyl) ethylene diamine, N,N'-dioxide. These organo-phosphono-amine oxides have been found to be especially effective sequestering agents for metal ions in alkaline mediums.

U.S. Pat. No. 3,383,174 claims an aqueous hydrogen peroxide solution stabilized against decomposition by contaminants containing a nitrilo trimethylene phosphonic acid compound and a tin compound soluble in aqueous hydrogen peroxide.

U.S. Pat. No. 4,070,442 discloses stabilization of aqueous hydrogen peroxide solutions by phosphonic acid stabilizers (Dequest 2000 ® and Dequest 2010 ®).

The present discovery improves upon the art by providing an additive that decreases catalyst deactivation. This object, and other objects and advantages, will be described in the below description of the invention, examples and claims.

SUMMARY OF THE INVENTION

The present invention concerns the use of multifunctional phosphonate or phosphate preparations to reduce catalyst deactivation, when used with metal equipment, in catalyzed processes for making hydrogen peroxide by direct combination of hydrogen and oxygen.

The invention also concerns a process for producing hydrogen peroxide which consists of contacting a mixture of gases comprising hydrogen and oxygen in the presence of a catalyst, in a liquid comprising water, a halide promoter, an optional stabilizer, and a multifunctional phosphonate or phosphate preparation.

DETAILED DESCRIPTION OF THE INVENTION

The production of hydrogen peroxide from the direct combination of hydrogen and oxygen using a platinum and/or palladium supported catalyst and a promoter is described in U.S. Pat. No. 4,772,458, U.S. Pat. No. 4,681,751, U.S. Pat. No. 4,889,705 and U.S. Pat. No. 4,832,938, all of which are incorporated herein by reference.

It has been found that the addition of a multifunctional phosphonate or phosphate preparation, preferably Dequest 2010 ®, to a system like those described in the above patents results in a decrease in catalyst deactivation (Dequest 2010 ® phosphonate is described in Monsanto Technical Bulletin No. 1C/SCS-323 which is hereby incorporated herein in its entirety).

Dequest 2010 has the structural formula:

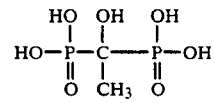

Other phosphonates are disclosed in the Monsanto Technical Bulletin at page 1. The general term "multifunctional phosphonate" refers to preparations of the structure: N—CH$_2$—P(=O)(—O)—O, as described in U.S. Pat. Nos. 2,599,807, 3,383,174 and 3,701,925 or O—(O—)(O=)P—C(—C)—P(=O)(—O)—O, as described in U.S. Pat. No. 3,122,417.

The process is usually carried out at a pH of less than about 8. Acids used in the reaction include hydrochloric, phosphoric, hydrobromic, sulfuric, nitric and perchloric acids. Sulfuric acid is preferred. The hydrogen concentration will be about $10^{-6}$ to 10M. The concentrations of acid and halide ion are related so that the best results are obtained with relatively high acid concentrations when the below described halide concentrations are at the low end of their ranges.

Promoters for the reaction herein include halide ions, preferably chloride and bromide ions or mixtures thereof, most preferably bromide ions. It is preferred to employ bromide ion concentrations between about $5 \times 10^{-5}$ and 0.2M. Choride ion concentrations will usually range between $1 \times 10^{-4}$ to 2M. The acid component helps to improve H$_2$O$_2$ yields at low halide levels. The total halide concentration in the reaction mixture is preferably not more than about $10^{-1}$ M.

The catalyst used herein preferably contains a metal component from Group VIII of the Periodic Table; Pd and/or Pt are preferred. Catalysts can be made in situ as described in U.S. Pat. No. 4,681,751 or preformed. Use of support for the catalyst is optional. The support may be alumina, carbon, silica, ion exchange resins and other support materials known in the art.

The relative pressures of O$_2$ and H$_2$ are preferably about 2 to 1 to about 20 to 1, or higher.

The reaction is preferably carried out at superatmospheric pressures.

The reaction temperature is about −50° C. to about 90° C., preferably 0° C. to 50° C. Lower temperatures may be employed as long as liquid freezing is not a problem.

An advantage to the use of an aqueous reaction system is that hazards, e.g., explosive characteristics, associated with the combination of high hydrogen peroxide concentrations and organic solvents are avoided. In regard to the danger of producing hydrogen peroxide in the presence of an organic component reference is made to the following publications: Swern, "Organic Peroxides", Wiley, Interscience, New York, 1970, especially page 26; Schumb et al., "Hydrogen Peroxide", Rinehold Publishing Corporation, 1955, page 179 and Halle, Chemical and Engineering News, November 19, 1984 at page 4.

The invention is further described in the below drawings and examples.

DESCRIPTION OF THE DRAWINGS

FIG. I describes the fractional uptake of hydrogen over time in a catalyzed hydrogen peroxide synthesis, in the presence of Dequest 2010 ® and is compared to the process conducted in its absence, in a Hastelloy ® reactor.

FIG. II describes the fractional uptake of hydrogen over time in a catalyzed hydrogen peroxide synthesis in the presence of Dequest 2010 ®, compared to the process conducted in its absence, in a stainless steel reactor.

Figure 1:
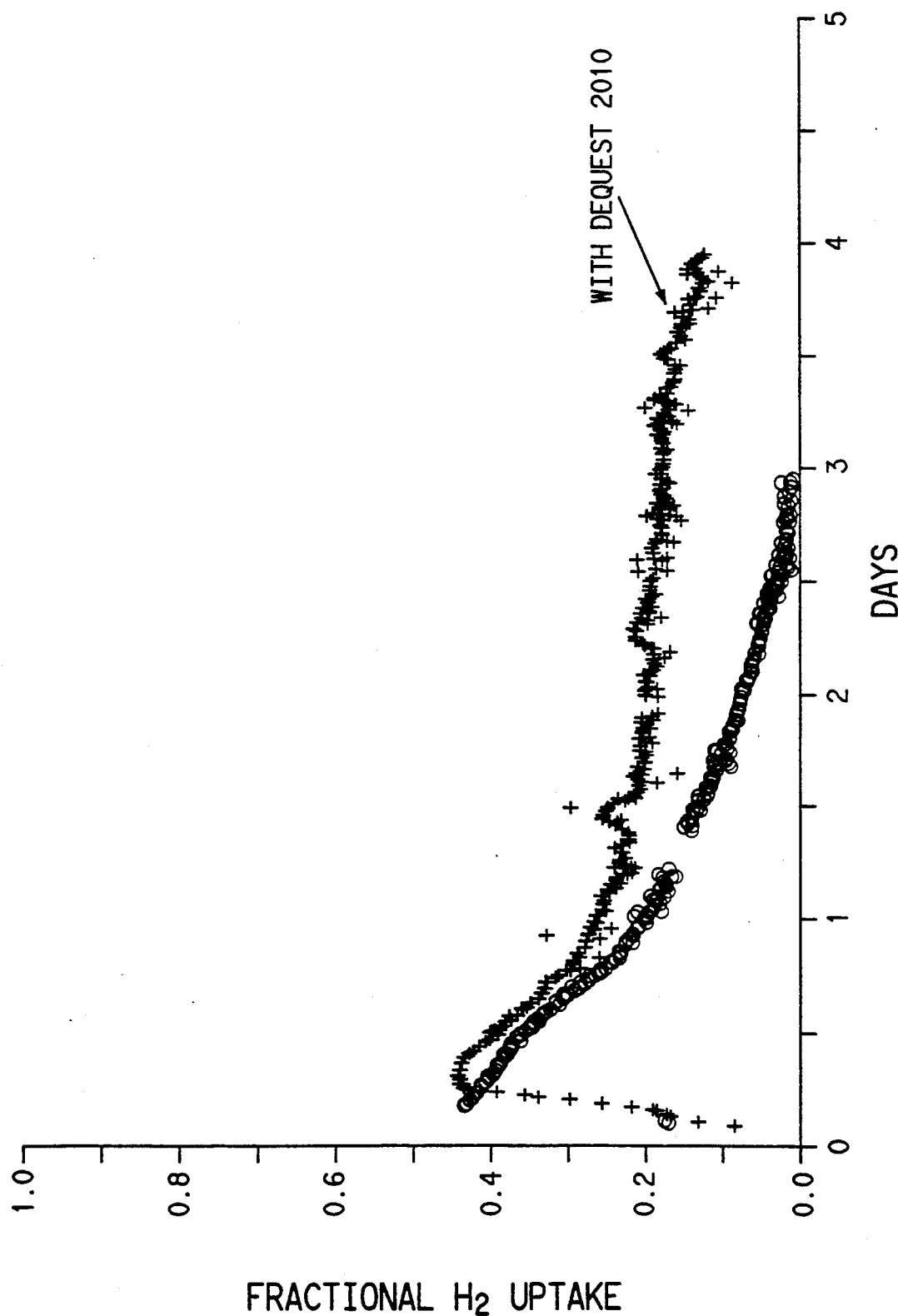
Figure 2:
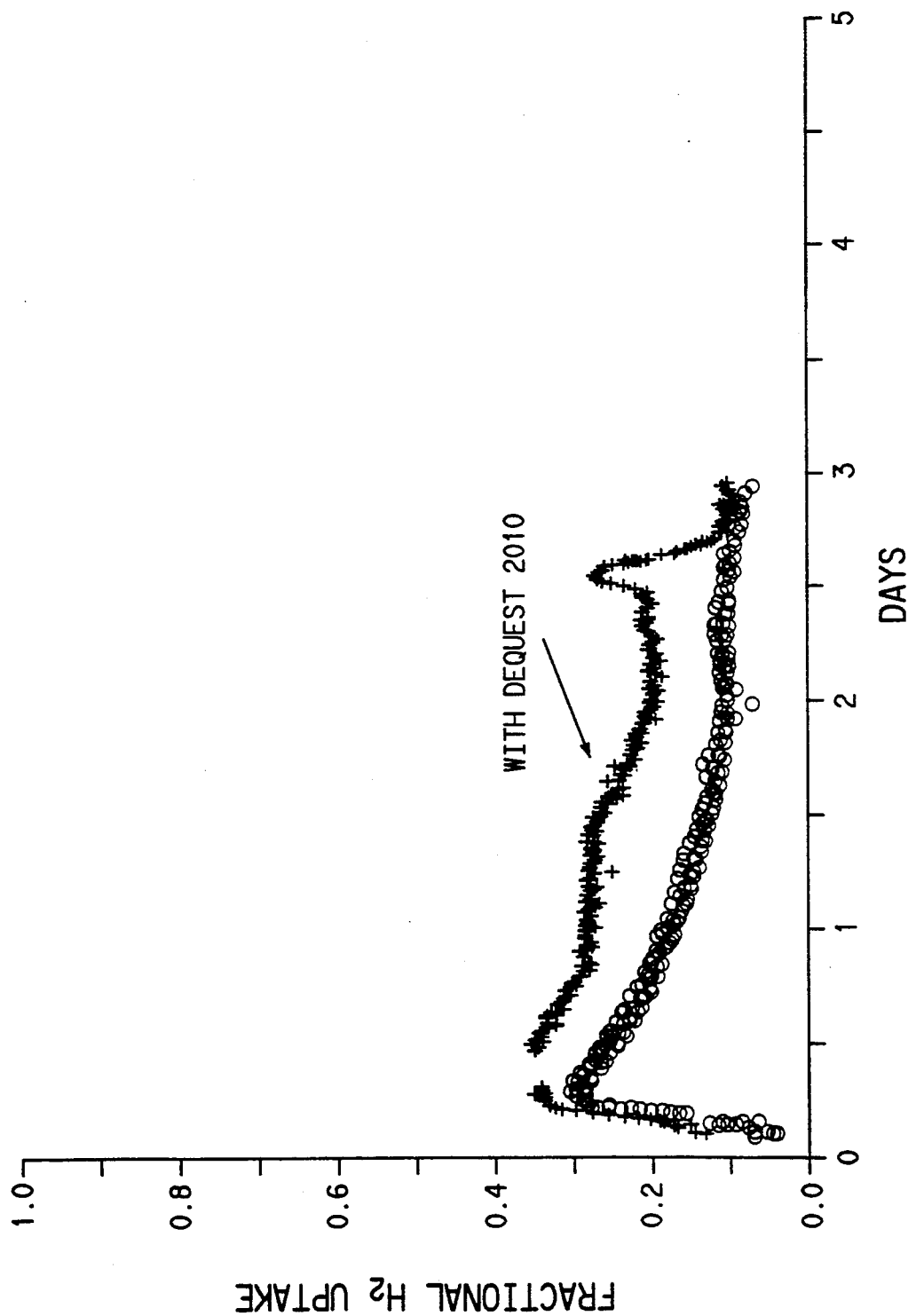

FIG. III describes the fractional uptake of hydrogen over time in a catalyzed hydrogen peroxide synthesis in a glass reactor.

EXAMPLES

Preparation of the Sample Tubes Used in the Semi-Batch Tests

Half inch diameter metal tubes of sufficient wall thickness to withstand 500 psi including a corrosion allowance estimated for exposure to the direct combination reagents for one week run time were procured and cut to 20" lengths. The tubes were washed with soap and water, then rinsed in de-ionized water that had been passed through a 18 MegOhm D.I. mixed bed cartridge.

One end was capped with a new Swagelok ® tube fitting and tubing cap both made of "Teflon ®". The tubes were mounted vertically inside a large beaker which acted as a drip pan. Into the tubes were put 30% nitric acid solution for 4 hours, then 30% "Perone EG" grade Hydrogen Peroxide was added for 3 days. The peroxide solution was replaced with fresh solution each 4 hour period. The tubes were observed for bubbles indicating peroxide decomposition. No bubbling was observed after the treatment with the exception of the aluminum tubes which had to be treated one additional day with peroxide solution to achieve passivation. Finally, the tubes were rinsed with 18 MegOhm D.I. water.

The tubes were bent to shape, cut to length and standard ½ inch tube fittings were put on the ends in preparation for mounting in the semi-batch reaction system.

COMPARATIVE EXAMPLE 1

A half inch diameter Hastelloy C ® tube was prepared as above.

The tubes were bent to the shape of a shallow "U" about 11" wide and 4" deep, and standard ½" tube fittings were put on the ends.

A reaction mixture was prepared from 10 mg of a 5%Pd on carbon catalyst (−500 mesh) and 2.0 g of solution prepared by mixing 17.6 g of purified water, 2.0 g of 1 N $H_2SO_4$ and 0.4g 0.1N NaBr. The mixture was sonified with an ultrasonic cleaning bath for a minute and then sparged with $H_2$ for a minute before it was placed in the tube. The tube was placed on a rocker in a steel barricade and attached to gas supply and exit equipment. During the reaction period a mixture of about 7% He in $H_2$ was fed at about 1.5 mL/min and $O_2$ was fed at about 10 mL/min (referenced to ambient pressure and temperature). Gas was allowed to flow from the reactor to maintain the total pressure near 1000 psi. After about 68 hours rocking in an about 2° C. cooling bath the reaction mixture weighed 2.44 g and contained 4.1 weight percent $H_2O_2$. The gas leaving the reactor during the run was sampled and analyzed by gas chromatography at 15 minute intervals. A molecular sieve 5A column was used with argon carrier gas and a thermal conductivity detector. At the end of the run a multiport valve was used to bypass the reactor tube fittings and gas chromatography data was collected with the same flows and pressure settings used in the run. This gave the gas composition fed into the reactor during the run. The He and $H_2$ concentrations entering and leaving the reactor tube can then be used to calculate the fraction of the $H_2$ consumed by the formula below.

$$\text{fraction of } H_2 \text{ consumed} = \left[1 - \frac{[He/H_2]in}{[He/H_2]out}\right]$$

The reactor tube from Comparative Example 1, above, was loaded as before with a reaction mixture prepared from 10 mg of the catalyst and 2.0 g of a solution prepared by mixing 15.6 g of purified water, 2.0 g of 1 N $H_2SO_4$, 2.0 g of a solution of 1% Dequest 2010 in water, and 0.4 g of 0.1 N NaBr. It was mounted in the barricade with gas flows and temperature as before. The reaction mixture taken from the tube reactor after 93 hours, weighed 3.15 g and contained 15 weight percent $H_2O_2$. Gas samples were analyzed during the run as before. The plots of the fraction of hydrogen consumed versus time on FIG. I show the improved persistence of catalyst activity in the presence of the Dequest.

COMPARATIVE EXAMPLE 2

A half inch diameter type 304 stainless steel tube was cut to 20 inches long. The tube was washed and conditioned as in Comparative Example 1. The tube was bent to the shape of a shallow "U" about 11" wide and 4" deep, and standard 1" tube fittings were put on the ends.

A reaction mixture was prepared from 10 mg of a 5% Pd on carbon catalyst (−500 mesh) and 2.0 g of solution prepared by mixing 17.6 g of purified water, 2.0 g of 1 N $H_2SO_4$, and 0.4 g of 0.1 N NaBr. The mixture was sonified with an ultrasonic cleaning bath for a minute and then sparged with $H_2$ for a minute before it was placed in the tube. The tube was placed on a rocker in a steel barricade and attached to a gas supply and exit equipment. During the reaction period a mixture of about 7% He in $H_2$ was fed in at about 1.5 mL/min and $O_2$ was fed in at about 10 mL/min (referenced to ambient pressure and temperature). Gas was allowed to flow from the reactor to maintain the total pressure near 1000 psi. After about 68 hours rocking in an about 2° C. cooling bath the reaction mixture weighed 2.52 g and contained 4.1 weight percent $H_2O_2$. The gas leaving the reactor during the run was sampled and analyzed by gas chromatography as in Comparative Example 1.

EXAMPLE 2

The reactor tube from Comparative Example 2, above, was loaded as before with a reaction mixture prepared from 10 mg of the catalyst and 2.0 g of a solution prepared by mixing 15.6 g of purified water, 2.0 g of 1 N $H_2SO_4$, 2.0 g of a solution of 1% Dequest 2010 in water, and 0.4 g of 0.1 N NaBr. It was mounted in the barricade with gas flows and temperature as before. The reaction mixture taken from the tube reactor after about 70 hours weighed 3.03 g and contained 20.7 weight percent $H_2O_2$. Gas samples were analyzed during the run as before. The plots of the fraction of hydrogen consumed versus time on FIG. II show the improved persistence of catalyst activity in the presence of the Dequest ®.

COMPARATIVE EXAMPLE 3

A very heavy walled glass tube about 8 mm ID was bent into a shape similar to that of the metal reactor tubes and was loaded as before with a reaction mixture prepared from 5 mg of the catalyst and 1.0 g of 1 N $H_2SO_4$, and 0.4 g of 0.1 N NaBr. It was mounted in the barricade with gas flows and temperature as before. However, after about 20 hours, the $H_2$ flow was reset to 1.2 mL/min. The reaction mixture taken from the tube reactor after about 44 hours (the run was stopped because of an equipment problem) weighed 1.44 g and contained 20.0 weight percent $H_2O_2$. Gas samples were analyzed during the run as before (the gas composition with no reactor had to be checked the next day). The plot of the fraction of hydrogen consumed versus time is shown on FIG. III.

Although preferred embodiments of the invention have been described hereinabove, it is to be understood that there is no intention to limit the invention to the precise constructions herein disclosed and it is to be further understood that the right is reserved to all changes coming within the scope of the invention as defined by the appended claims.

We claim:

1. A process for producing hydrogen peroxide which comprises contacting a mixture of gases comprising oxygen and hydrogen with a metallic catalyst in the presence of a substantially aqueous reaction medium, an acid, a promoter and a multifunctional phosphonate preparation of the structure: N—$CH_2$—P(=O)-(—O)—O or O—(O—)(O=)P—C(—C)—P(=O)-(—O)—O.

2. The process of claim 1 conducted in the presence of a stabilizer.

3. The process of claim 1 wherein the metallic catalyst is selected from metals in Group VIII.

4. The process of claim 3 wherein the metallic catalyst is selected from Pd and Pt.

5. The process of claim 4 wherein the catalyst is Pd.

6. The process of claim 4 wherein the catalyst is Pt.

7. The process of claim 3 wherein the catalyst is supported.

8. The process of claim 7 wherein the support is selected from alumina, carbon, silica, and ion exchange resins.

9. The process of claim 1 wherein the promoter is a halide.

10. The process of claim 8 wherein the promoter is a bromide.

11. The process of claim 9 wherein the halide concentration in the reaction mixture is not more than $10^{-1}$ M.

12. The process of claim 1 wherein the acid is selected from hydrochloric acid, phosphoric acid, sulfuric acid, nitric acid and perchloric acid.

13. The process of claim 12 wherein the acid is sulfuric acid.

14. The process of claim 1 carried out at superatmospheric pressure.

15. The process of claim 1 conducted within a temperature range of −50° C. to 90° C.

16. The process of claim 15 wherein the temperature range is 0° C. to 50° C.

17. The process of claim 1 wherein the multifunctional phosphonate is Dequest 2010.

* * * * *